United States Patent [19]

Przybyla et al.

[11] Patent Number: 4,908,792
[45] Date of Patent: Mar. 13, 1990

[54] CONTROL SYSTEM TO CONTROL OPERATION OF AN APPARATUS, MORE PARTICULARLY OPERATION OF AN AUTOMOTIVE VEHICLE

[75] Inventors: Bernd Przybyla, Schwieberdigen; Alfred Bruckelt, Steinheim; Michael Kirschner, Pforzheim, all of Fed. Rep. of Germany

[73] Assignee: Robert Bosch GmbH, Stuttgart, Fed. Rep. of Germany

[21] Appl. No.: 87,995

[22] Filed: Aug. 17, 1987

Related U.S. Application Data

[63] Continuation of Ser. No. 698,318, Feb. 5, 1985, abandoned.

[30] Foreign Application Priority Data

May 25, 1984 [DE] Fed. Rep. of Germany ....... 3419559

[51] Int. Cl.$^4$ .................... G06F 15/20; G06F 13/00
[52] U.S. Cl. .................. 364/900; 364/431.04; 364/431.12; 364/200
[58] Field of Search ... 364/200 MS File, 900 MS File

[56] References Cited

U.S. PATENT DOCUMENTS

| | | | |
|---|---|---|---|
| 3,614,740 | 10/1971 | Delagi | 364/200 |
| 3,623,008 | 11/1971 | Doblmaier | 364/200 |
| 4,156,917 | 5/1979 | Olander, Jr. et al. | 364/200 |
| 4,267,569 | 5/1981 | Bauman et al. | 364/431.01 |
| 4,337,513 | 6/1982 | Furuhashi | 364/200 |
| 4,488,257 | 12/1984 | Hosaka | 364/900 |
| 4,580,212 | 4/1986 | Hosaka | 364/200 |
| 4,623,974 | 11/1986 | Denz et al. | 364/551 |
| 4,625,697 | 12/1986 | Hosaka | 364/200 |
| 4,677,558 | 6/1987 | Böhmler et al. | 364/900 |

FOREIGN PATENT DOCUMENTS

| | | |
|---|---|---|
| 2460497 | 6/1976 | Fed. Rep. of Germany . |
| 2923427 | 12/1980 | Fed. Rep. of Germany . |
| 4488257 | 7/1984 | Fed. Rep. of Germany . |
| 2427646 | 12/1979 | France . |

OTHER PUBLICATIONS

Derwent WPI Abstract of DE-OS 24 60 497.
Morales et al.; "Adding EEPROM to ROM Expands IC Versatility"; Oct. 13, '83; EDN, vol. 28, No. 21. Esp., pp. 177-179, 183 & 189.
Winch; "A Modular Approach . . . "; Feb. 21, 1984; New Electronics, GB.
Doehle et al.; "Read-Only Store Patch"; Jun. '81; IBM Technical Disclosure Bulletin, vol. 24, No. 1A.

Primary Examiner—Andrew J. James
Assistant Examiner—Viet Q. Nguyen
Attorney, Agent, or Firm—Frishauf, Holtz, Goodman & Woodward

[57] ABSTRACT

To increase the versatility of a central processing unit (30) controlling an operating apparatus, such as apparatus including an engine, installed in an automotive vehicle, a main read-only memory (ROM, 40) stores not only operating data of the vehicle and/or the engine, but additionally, the organization program of the central processing unit (CPU, 30) in modular, or block form in the ROM (40). An auxiliary ROM (41) preferably an electronically erasable ROM is connectable, via an interconnection bus (80) to the CPU (30) and an initial program stored in the main ROM (40) provides a determination or recognition step to be carried out by the CPU (30) first, to determine if the auxiliary EPROM (41) is present; and, if so, to then address the auxiliary EPROM (41) for control of the program run of the CPU; if not, to take programming operating data directly from the ROM (40). The programming stored in the auxiliary EPROM (41) may direct the CPU (30) to carry out programming steps stored in the main ROM (40) in the stored sequence, or in changed sequences, as well as to take operating steps directly from the auxiliary EPROM (41). All programming data are stored in the auxiliary EPROM (41) also in modular or block form, and preferably include diagnostic programs relating to monitoring a function of the vehicle or of the engine, under control of data computed by the CPU (30).

10 Claims, 1 Drawing Sheet

CONTROL SYSTEM TO CONTROL OPERATION OF AN APPARATUS, MORE PARTICULARLY OPERATION OF AN AUTOMOTIVE VEHICLE

This application is a continuation of application Ser. No. 698,318, filed Feb. 5, 1985, now abandoned.

Reference to related patents, the disclosures of which are hereby incorporated by reference, assigned to the assignee of the present patents:

U.S. allowed application Ser. No. 692,381, filed Jan. 17, 1985 Heinz BOHMLER et al. now U.S. Pat. No. 4,677,558, issued June 30, 1987, "Method and System for Controlling Operation of an Apparatus or Engine, Particularly Internal Combustion Engine".

U.S. application Ser. No. 710,171, now U.S. Pat. No. 4,751,633, filed Mar. 11, 1985 HENN et al. U.S. Pat. No. 4,751,633.

Reference to related patents assigned to others, the disclosures of which are hereby incorporated by reference:

U.S. Pat. No. 4,084,240, Lappington,
U.S. Pat. No. 4,255,789, Hartford,
U.S. Pat. No. 4,488,257, Hosaka.

The present invention relates to an electronic control system for an apparatus and more particularly to an electronic control system to control various operating functions occurring in an automotive vehicle, for example functions relating to operation of the vehicle engine, such as ignition timing, fuel injection and the like, and functions relating to operation of the vehicle, such as gear shifting, monitoring of door locks, passenger restraint systems, and diagnostic cycles to pinpoint possible malfunction or incipient apparatus defect.

BACKGROUND

Various types of control systems, especially control systems for use with automotive vehicles have been proposed. Typical automotive-type electronic control systems use microprocessors which include a central processing unit, read-only-memories (ROMs) and buffer memories, such as random access memories (RAMs). It has also been proposed to include in the system an auxiliary ROM, which permits correction of data or change of data. Change of data or correction of data is desirable under some circumstances, for example, if a specific engine is to be associated with a vehicle of a different type, for example of a different weight, or if the model or series of the vehicle and/or of the engine changes. The presence or absence of such an auxiliary ROM can be determined by storing, in a predetermined address, a characteristic data word, for example a single logic-1 already during programming of the system; the address of the auxiliary data word is then interrogated by the program cycle which is run by the central processing unit (CPU) of the microprocessor. Such an auxiliary ROM is used to change data within the main ROM, in order to, for example, match specific operating data stored in the ROM to a specific engine. It is possible, for example, to recognize different constants or different vectors or different functional relationships or tables. It is not possible, however, to change the overall program cycle since the sequence of programming steps carried out by the CPU is based on the memory content within the main ROM.

THE INVENTION

It is object to increase the versatility of electronic control systems for use with apparatus carrying out various operating steps, and more particularly, a control system for use with an automotive vehicle in which the programming sequence of predetermined steps can be changed or the steps themselves within any predetermined sequence can be changed.

Briefly, program data are stored in modular form in the main ROM and, also, in modular form in the auxiliary ROM. The program data in the main ROM include, as a programming step, a basic recognition step to recognize the presence, or absence of the auxiliary ROM. If the auxiliary ROM is recognized as being present and connected to the CPU, for example, through a main bus, the CPU then will interrogate the auxiliary ROM, and its further operating cycle will be controlled by the programming data stored in modular form in the auxiliary ROM.

The auxiliary ROM, thus, can provide for differently-sequenced programming steps to be carried out by the CPU, for programming steps which are not contained within the main ROM, and for example, additional diagnostic programs to be run. The auxiliary ROM thus not only expands the availability of data, but also the versatility of the programming run itself.

The system has the advantage that, after adding the auxiliary ROM, the run, or sequencing of the functions controlled by the CPU can be changed, as selected, and amplified by adding new program cycles or functions. This substantially increases the the flexibility of the overall system.

An an example, it is possible to interchange the sequencing of ignition timing of an internal combustion engine and gear shifting control; it is also possible to store in the auxiliary ROM function data and programming sequences which can be selectively activated, depending on specific requirements of customers, who may order accessories and additional functions which are not provided as standard equipment in an automotive vehicle. For example, the auxiliary ROM may include control functions relating to air conditioning, change of an engine from a four cylinder to a six cylinder unit, automatic seat positioning and the like.

The control system then permits increasing the number of operational instructions and the number or frequency of iterations (executions) of specific subsets of those instructions carried out by a basic CPU by adding an additional ROM. This ensures high flexibility of the control unit and ready accommodation of specific requirements by customers, and can be added either at the time the vehicle is built, or equally simply, at the time the vehicle is delivered, for example, by changing the programming of the CPU at the dealer's service station.

In accordance with the preferred embodiment, the additional ROM also includes diagnostic programs, to thereby permit control of diagnostic steps or programs. This, then, permits additional individual diagnosis in dependence on the desired functions, for example in dependence on added desired functions, which can be carried out and quickly and require little operating time of the CPU itself.

DRAWINGS

FIG. 1 is a schematic illustration of the control unit in accordance with the present invention; and FIG. 2 shows the arrangement and organization of a main ROM and an auxiliary ROM in accordance with the present invention.

DETAILED DESCRIPTION

Figure 1:
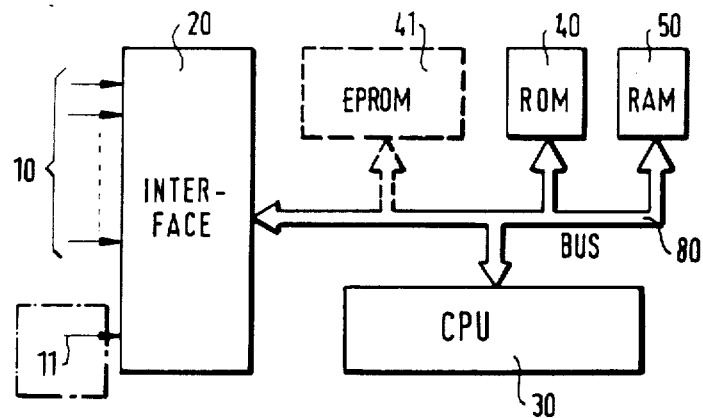
Figure 2:
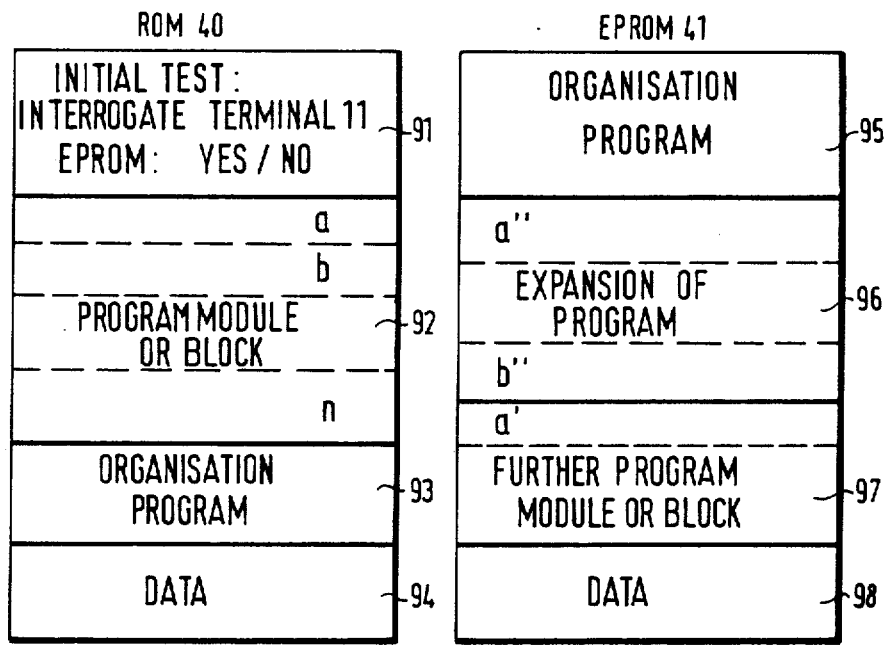

The basic structure of the microcomputer system shown in FIG. 1 is known. FIG. 1 illustrates the control unit specifically adapted to control various functions in an automotive vehicle. Functions to be controlled are, for example, ignition timing, fuel injection, fuel injection quantity, control of composition of exhaust gases, exhaust gas recirculation (EGR), monitoring functions, such as monitoring operation of the ignition or main operating switch and its locks, passenger restraint unit, such as seat belts and the like Vehicular operating controls such as automative gear shift controls, automatic overdrives can be part of the microprocessor control system, as well as diagnostic programs.

The control system includes an interface unit 20, which forms an interface between input and output circuits, schematically indicated by arrows 10, and the microprocessor itself. The interface, in addition to the input circuits 10 from sensors and various output circuits (not shown) for example for positioning elements and the like, further includes a separate and special input 11. The input 11 is so connected that it provides an input signal if an auxiliary memory 41 is connected to the system. In a simple way, the terminal 11 may include no more than a resistor which is connected to ground, or to a supply voltage terminal (not shown) so that the voltage state of the terminal 11 at the interface can be interrogated. The terminal 11 may form part of the memory 41, and can be hard-wired therein. It is shown separately connected to the interface 20 merely for convenience of illustration. Various other construction possibilities are, of course, possible; a suitably connected resistor is one of the simplest ways to recognize the presence, or absence of an auxiliary memory.

A data bus 80 is connected to the interface 20 which, in turn, is connected to the various other elements of the control system. The control system includes a central processing unit (CPU) 30 which carries out arithmatic logical operations in accordance with previously programmed commands, and delivers the computed results. The programming steps themselves, as well as the data on which the computations are to be carried out are stored in memories. One of the memories is a read-only fixed memory 40, shown as an ROM. The ROM 40 stores a series of preprogrammed commands, in modular addresses. The stored commands are interrogated by the CPU 30. Further, a buffer memory 50, shown as an RAM (random access memory RAM) is provided. The RAM receives continuously variable data for buffer storage thereof. A further ROM 41 is provided, preferably in the form of an electronically programmable ROM (EPROM). The basic system is operative even without the presence of the EPROM 41.

OPERATION, WITH REFERENCE TO FIG. 2

The initial step 91 is started upon first connecting the control system, for example upon operation of the main switch or the ignition switch of the motor vehicle. This initial step causes the registers of the CPU 30 and the memory in the RAM 50 to assume previously determined values, for example to reset the registers, or to set them to previously determined constants, to count down from these constants. Further, the interface 20 effects connection of the respective lines 10, and the corresponding output lines (not shown) to the various transducers and operating units within the vehicle. Additionally, an interrogation of terminal 11 is carried out to determine if the auxiliary EPROM 41 is connected. This test can be carried out, for example, by interrogating the voltage state at terminal 11.

Upon termination of the programming step 91, the appropriate organization or housekeeping program is then initiated. Let it first be assumed that the EPROM 41 is absent. The selective placement of the EPROM 41 and hence the connection of terminal 11 is shown in the drawings, schematically, by the broken line box around the units 11 and 41. If the EPROM 41 is absent, the next step after step 91 will be step 93, namely, to address the organization program which is stored in the ROM 40. The organization or housekeeping program then causes the respective programming cycles, which are stored in program modules, or program blocks 92, in a predetermined sequence, schematically illustrated by a, b . . . n. The sequence of the program run of the various blocks is invariant. For example, the program block a, as a first program block, provides the necessary steps to the CPU to compute the ignition timing, that is, ignition angle, based on the then actually pertaining operating data of the vehicle, for example, whether it is operating under starting conditions, temperature of manifold inlet air and the like. A second programming block, block b may, for example, control exhaust gas composition. A third programming block may, for example, control the operating sequence for windshield wipers—if connected. It is not necessary that all programming blocks 92 be carried through completely. The housekeeping or organization program 93 can be arranged to provide for "skip" of programming steps which are not needed, for example, merely to test if windshield wipers are connected, and, if no manual connection to windshield wiper control is found to skip to the next step.

The ROM 40 contains, in a further block 94, the data which are required for calculation of the programming steps, in the programming blocks 92. For example, the values which are necessary to compute appropriate ignition timing can be stored at respective addresses in the data module 94. The data can thus be calculated, by addressing respective addresses, based on whether a four cylinder engine or a six cylinder engine is provided in the vehicle. The data are fixed, which are predetermined by the design characteristics of the engine and the vehicle and are invariant. The data may include, additionally, operating constants, and functional relationships or tables, for example, relating ignition timing to temperature of the engine, in order to appropriately control a specific engine, on which the data, or tables or functional relationships are based.

The basic structure of the control system thus described is known, and various types of vehicles can be operated and controlled thereby. It is readily possible to manufacture such control systems under mass production conditions.

Upon further development of the vehicle and its engine, it frequently arises that technical data relating to the vehicle and/or the engine will change. Such changed operating characteristics then require rapid matching of the control system to the changed operating characteristic. To provide for such rapid matching, an additional ROM 41 is provided which includes data relating to such changes.

In accordance with a feature of the present invention, the data stored in the auxiliary EPROM 41 contains not only additional data relating to operation, and characteristics of the engine but, further, data which change the sequence of operating cycles of the programming module, and/or add to the operating cycles themselves. This substantially increases the versatility of the system. Even if the type of vehicle and/or engine does not change, various options, and accessories can then be selectively controlled, in accordance with specific requirements by a customer. For example, if the customer desires additional apparatus requiring control functions, they can easily be added, and controlled from the CPU. Typical additions or optical accessories are an automatic seat adjustment; an air conditioning system, or the like.

In accordance with a feature of the invention, the additional or auxiliary memory 41 is constructed in the form of an EPROM, which can be programmed during manufacture of the vehicle, to customer specifications, or as a service installation of the ultimate dealer. The programming of the auxilliary EPROM 41 can also be carried out by the vehicle manufacturer, particularly if a change in design characteristics of the engine, or a different engine from the one for which the ROM 40 was programmed, is installed, or desired by a customer.

During the initial step 91, which is the first programming step upon first connecting the unit, determination if the EPROM 41 is present is also made. Let it now be assumed that the EPROM 41 has been connected. At step 91, upon interrogation of the ROM 40, terminal 11 is interrogated and it is found that the EPROM 41 is connected. At this point, the CPU 30 will no longer address the housekeeping or organization program 1 of block 93 in the ROM 40 but, rather, switch immediately to the new organization program 2 in block 95. The organization program 2 in block 95 is stored in the EPROM 41. The organization program 2 in block 95 then provides for, selectively, addressing the program modules, or blocks a, b, ... n in the program block 92 as well as a further program block 97, likewise placed in modular form in the EPROM 41. Additionally, it is possible to change the program cycles, and to invert or interchange the sequencing of the programming cycles. For example: the organization program 2, block 95 may control the CPU to first address data containing a program a' stored in the further block 97, controlling, for example, fuel injection of the engine, and then directing the program to return to the program block 92, program cycle a, to then calculate ignition timing. The organization program 2 within block 95 of the EPROM 41 thus provides the possibility to extend the functions, as well as to interchange the sequence of functional steps. This arrangement substantially increases the flexibility of the overall control system, for example upon change in engines, vehicles, and their characteristics, or if specific accessories or options are requested by a customer.

The EPROM 41 also permits the addition of further programming cycles, not contained with the programming block 92. Such further cycles may be placed in a programming block 96, for example, to amplify and add to the programming steps in programming block 92. It is, thus, for example possible to render more accurate an already present ignition timing by relating ignition timing to fractions of full degrees of crank shaft rotation, by more finely dividing the ignition timing signals, and thus to eliminating truncating errors due to coarser subdivisions. Additional programming cycles which are particularly suitable and desirable are special diagnostic runs which may be due to the new organization of the sequencing and/or presence of new control cycles within the block 96 and/or the block 97.

The EPROM 41 additionally includes data on which the further program blocks 97, and the additional programming steps block 96, are based. For example, the programming step a" of block 96 may include a program controlling operation of an air conditioning unit, based on vehicle temperature; and the programming step b" block 96, a diagnostic program if the feedback of temperature determines that the air conditioning system is not functioning properly.

The system thus permits providing data for the new programming modules, for example in block 98, as well as expansion of the programming steps themselves. The data can be changed by adding specific characteristics, and/or functional characteristics or tables. The basis is the addition of the auxiliary ROM 41 which includes not only additional data to be interrogated in accordance with a fixed program, block 92 of the ROM 40, but, in accordance with a feature of the invention, also an additional program, block 95 in the EPROM 41, besides the further programs in block 97 relating to changes in the basic program of block 92 and further expansion of the program, block 96, not present in the basic program, block 92 at all. The specific construction of the EPROM 41, thus, can match the operating and programming cycles directly to the requirements of any specific engine and vehicle.

We claim:

1. A vehicular microcomputer system, to control operation of an internal combustion engine and additional vehicular apparatus, having a central processing unit (30);

an interface (20);

means (10) to apply apparatus operating data to the interface (20);

read-only memory (40);

a buffer random-access (RAM) memory (50);

an interconnection bus (80) interconnecting the central processing unit (30), the interface (20), the read-only memory (40) and the buffer memory (RAM) (50);

an auxiliary read-only memory (41) selectively connectable to said interconnection bus (80);

and means (11) coupled to the central processing unit (30) to recognize whether or not the auxiliary read-only memory (41) is connected to the bus (80), and comprising, in accordance with the invention, means for controlling the operation of the program of the central processing unit (30) including program data (91-94) stored in modular or block form in the read-only memory (40) and auxiliary program data (95-98) stored in modular or block form in the auxiliary read-out memory (41);

the program data stored in the read-only memory (40) including a basic organization program (93), a program step (91) for recognition of the presence of the auxiliary read-only memory (41); and a conditional instruction that, whenever the presence of the auxiliary read-only memory (41) is recognized, the central processing unit (30) is to execute selected instructions or program steps (92, 96,97) from the read-only memory (40) and the auxiliary read-only memory (41) according to a program sequence (95), in the auxiliary memory (41), alternative to, and to the extent necessary, inverted with respect to, the sequence in said basic organization program (93).

2. System according to claim 1 wherein the auxiliary read-only memory (41) stores apparatus control operating steps in addition to apparatus control operating steps stored in the main read-only memory (40).

3. System according to claim 1 wherein the auxiliary read-only memory stores program steps defining diagnostic programs.

4. System according to claim 1 wherein the auxiliary read-only memory (41) stores diagnostic program monitoring operations of the apparatus controlled by program steps stored in the auxiliary read-only memory and providing diagnostic output relating to operation or possible malfunction of the apparatus as controlled by the program steps in the auxiliary read-only memory.

5. System according to claim 1 wherein the auxiliary read-only memory is an electronically programmable read-only memory (EPROM) (41).

6. Method of controlling operation of a motor vehicle having a central processing unit (CPU) (30);
an interface (20) and means (10) for applying operating data to the interface;
a main read-only memory (ROM) (40) containing blocks of instructions;
a buffer memory (RAM) (50);
an interconnection bus (80) interconnecting the central processing unit (30), the interface (20), the main read-only memory (ROM) (40), and the buffer memory (RAM) (50); and
an auxiliary read-only memory (EPROM) (41), containing blocks of instructions, selectively connectable to the interconnection bus (80); and comprising, in accordance with the invention, the steps of
controlling the operation of the central processing unit (CPU) (30) as a function of both instructions stored in the main read-only memory (ROM) (40) and any instructions stored in the auxiliary read-only memory (41); and
the step of determining, in a basic program step stored in the main read-only memory (40), whether or not the auxiliary read-only memory is connected to the interconnection bus (80); and (a) if no interconnection of the auxiliary read-only memory (41) to the interconnection bus (80) is recognized, executing in the CPU the instructions contained in the read-only memory (40), based on a program sequence (93) stored in the main read-only memory (40); and (b) if presence of the auxiliary read-only memory (41) is recognized, executing in the CPU a sequence of instructions specified by a program sequence (95) stored in said auxiliary ROM (41) including instructions stored in at least one of said main ROM (40) and said auxiliary ROM (41).

7. Method according to claim 6, wherein a program sequence (95) is stored in the auxiliary read-only memory (41), and said sequence points to program steps unique to the auxiliary read-only memory (41) as well as program steps stored in the main read-only memory (40).

8. Method according to claim 6, wherein a program sequence (95) is stored in the auxiliary read-only memory (41), and said sequence instructs the central processing unit (CPU) to execute program steps stored in the main read-only memory (40) in a sequence inverted with respect to a sequence in which said program steps were stored in the main read-only memory (40).

9. Method according to claim 6, wherein a program is stored, in the auxiliary read-only memory (41), which includes instructions directing the central processing unit to carry out a diagnostic, monitoring program for monitoring and supervising the operation of said motor vehicle for proper operation thereof and, if improper operation is found, for providing a malfunction diagnostic output.

10. Method according to claim 6, wherein
said motor vehicle includes an engine installed in the vehicle; and
the program steps stored in the main read-only memory (40) and in the auxiliary read-only memory (41) include programming and functional operating data for control of the vehicle, including at least the engine thereof, based on computer data computed by the central processing unit (CPU).

* * * * *